US005370282A

United States Patent [19]

Sedlmeier

[11] Patent Number: 5,370,282

[45] Date of Patent: Dec. 6, 1994

[54] ADVANCING MECHANISM FOR A DISPENSING TOOL

[75] Inventor: Amdreas Sedlmeier, Ummendorf, Germany

[73] Assignee: Hilti Aktiengesellschaft, Furstentum

[21] Appl. No.: 123,393

[22] Filed: Sep. 17, 1993

[30] Foreign Application Priority Data

Sep. 19, 1992 [DE] Germany ............................ 4231418

[51] Int. Cl.[5] ........................ B67D 5/42; G01F 11/00

[52] U.S. Cl. .............................. 222/391; 222/105; 222/386

[58] Field of Search .................. 222/95, 105, 325-327, 222/386, 391

[56] References Cited

U.S. PATENT DOCUMENTS

| | | | |
|---|---|---|---|
| 2,305,238 | 12/1942 | Coates | 222/391 X |
| 2,420,203 | 5/1947 | Sherbondy | 222/391 X |
| 2,582,156 | 1/1952 | Peterson | 222/391 X |
| 2,726,802 | 12/1955 | Jones | 222/391 X |
| 2,731,176 | 1/1956 | Crewe | 222/391 X |
| 2,732,102 | 1/1956 | Elkins | 222/391 X |
| 2,784,603 | 3/1957 | Collins | 222/391 X |
| 3,311,265 | 3/1967 | Creighton, Jr. et al. | 222/327 X |
| 3,381,861 | 5/1968 | Stein | 222/391 X |
| 4,072,254 | 2/1978 | Cox | 222/391 |
| 4,081,112 | 3/1978 | Chang | 222/391 |
| 4,330,070 | 5/1982 | Doubleday | 222/391 X |
| 4,681,524 | 7/1987 | Ikeda et al. | 222/391 X |
| 4,840,294 | 6/1989 | Ernst | 222/391 X |
| 5,192,008 | 3/1993 | Hwan | 222/391 |
| 5,197,635 | 3/1993 | Chang | 222/391 X |

FOREIGN PATENT DOCUMENTS

| | | | |
|---|---|---|---|
| 3151662 | 7/1983 | Germany | 222/391 |
| 663733 | 1/1988 | Switzerland . | |
| 1555455 | 11/1979 | United Kingdom | 222/391 |
| 2186544 | 8/1987 | United Kingdom | 222/391 |

*Primary Examiner*—Kevin P. Shaver

*Attorney, Agent, or Firm*—Anderson, Kill, Olick & Oshinsky

[57] ABSTRACT

A tool for dispensing a single component or a multi-component mass by pressing the mass out of a foil bag (3) includes a piston rod (7) and a piston rod advancing mechanism (6). The advancing mechanism (6) has two pivotally movable clamping levers (12, 13) mounted on the piston rod (7). A triggering lever (11), pivotally displaceable between a pair of spaced end stops (5*b*, 5*c*), forms a stop in contact with one of the clamping levers. An unlocking lever (17) acts substantially simultaneously on both of the clamping levers (12, 13).

4 Claims, 1 Drawing Sheet

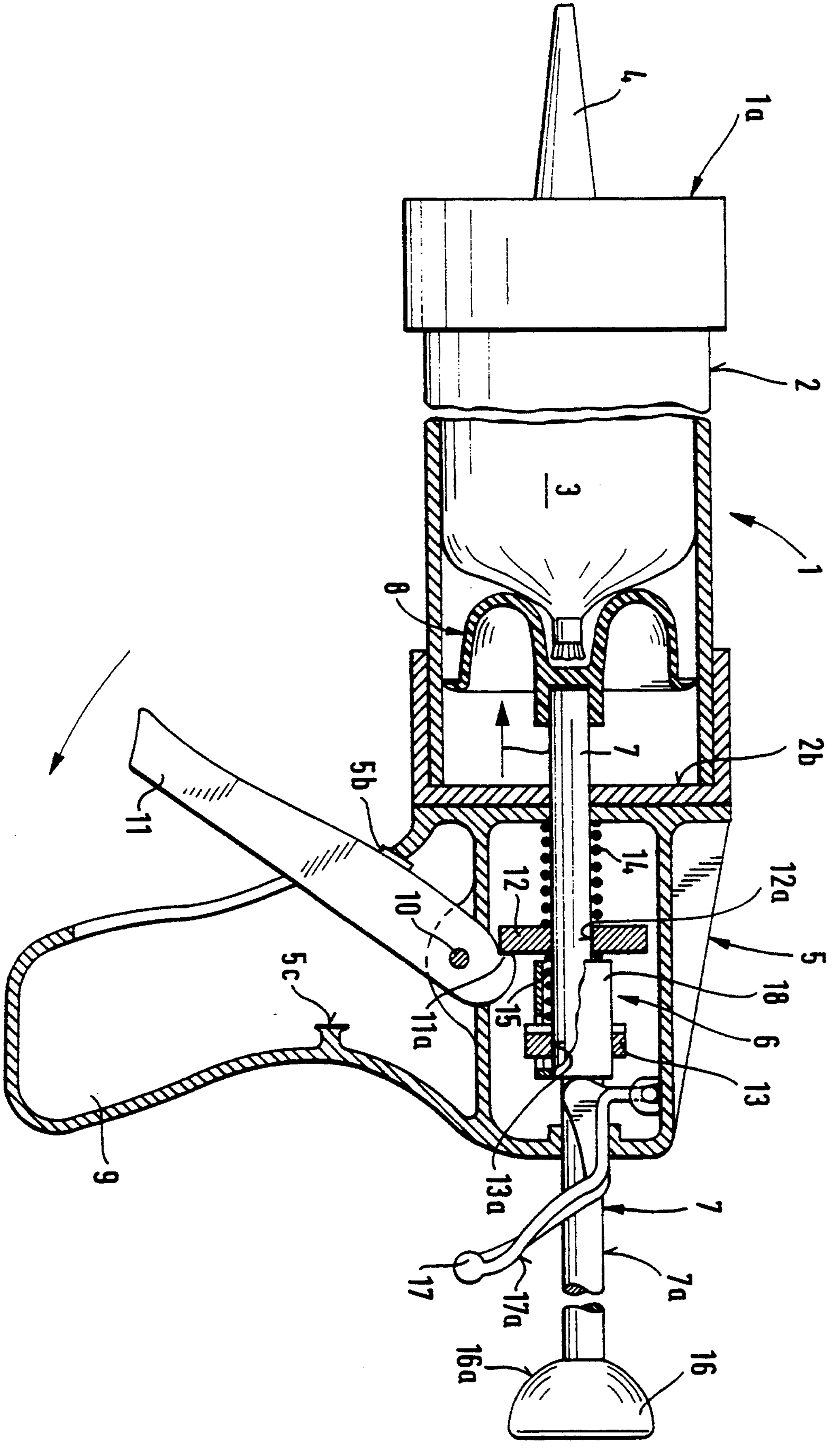
4
1a
2
3
1
8
7
2b
5b
11
14
12
12a
10
5
18
11a
15
6
5c
13
13a
9
7
17
17a
7a
16a
16

ADVANCING MECHANISM FOR A DISPENSING TOOL

BACKGROUND OF THE INVENTION

The present invention is directed to a tool for dispensing a single component or multi-component mass located within a cartridge or foil bag by pressing the mass out of the cartridge or foil bag. The tool includes at least one advancing or feeding mechanism for at least one piston rod. The advancing mechanism comprises at least two clamping levers which can be pivoted in the axial direction of the piston rod and can also be axially displaced along the rod. In addition, at least two springs cooperate with the clamping lever along with one triggering lever and an unlocking lever. A first one of the clamping levers serves to advance the piston rod while the second one of the clamping levers locks or latches the piston rod, and the unlocking lever cooperates with the second one of the clamping levers as well as with the piston rod.

A single component or a multi-component mass is used at the present time for many varied applications in buildings, motor vehicles, ships, aircraft, machines, instruments and many other apparatuses. To afford convenient handling for the tool operator, the mass is usually supplied in small containers such as cartridges or foil bags, which can be inserted into the tool and pressed or squeezed out.

A manually operated dispensing tool for multi-component masses is disclosed in CH-PS 663 733. To prevent a return stroke of the piston rod when the first clamping lever regrips the rod for the advancing step, the tool includes a second clamping lever for each piston rod which serves to lock the piston rod in place. Such a second clamping lever must be released so that the piston rods can be pulled back to their original position. This return action is effected by an unlocking lever in engagement with the second clamping lever.

In this known dispensing tool, the arrangement of the advancing and unlocking mechanism has proved to be disadvantageous. The first clamping lever serving for advancing the piston rod is located in a central entrainment element disposed in such a way on the piston rod that in its initial position it rests at a stop face extending at a right angle to the axial direction of the piston rod. When the triggering lever is actuated, the first clamping lever is pivoted relative to the piston rod providing a clamping action by the clamping lever on the shaft piston rod. Only when the triggering lever is further actuated does the advancing of the piston rod take place. In such an advancing mechanism a part of the actuation travel of the triggering lever is always used for clamping the clamping lever against the piston rod. This has a disadvantageous effect on the handling of the dispensing tool and also on the processing time for the masses disposed in the cartridges in the tool.

If unhardened piston rods are used, wear can take place in the shaft region of the rod. Such wear is noticeable as a reduction in the diameter of the piston rod. To reach a clamping position of the first clamping lever acting to advance of the piston rod where the rod is worn, additional actuation travel of the triggering lever is necessary and, as a result, there is less actuation travel for the actual advancing of the piston rod.

Another disadvantage is experienced with the unlocking mechanism, where the unlocking lever acts upon the second clamping lever which serves to lock the piston rod. When the piston rod has reached the end of the dispensing operation when the mass has been completely squeezed out, in this front end position actuation elements disposed on the piston rod act on the unlocking lever. Accordingly, the piston rod is not locked in its front end position. A force transmitted by the triggering lever to the first clamping lever acts fully on the front region of the tool in the dispensing direction. As a result, damage can occur in that region and could finally lead to destruction of the tool.

SUMMARY OF THE INVENTION

Therefore, the primary object of the present invention is to provide a dispensing tool where the actuation travel of the triggering lever serves entirely and fully for advancing the piston rod which prevents damage caused by the front end of the piston rod and which can be manufactured economically.

In accordance with the present invention, the triggering lever serves as an axial stop for the first clamping lever. The triggering lever is pivotally displaceable between two end stops and the first clamping lever cooperates with the unlocking lever essentially simultaneously with the second clamping lever.

By using the triggering lever as the stop for the first clamping lever, the first clamping lever can be pivoted by a compression spring counter to the direction in which the mass is squeezed out of the tool, whereby the first clamping lever assumes it clamping position when it is in its initial position. The entire actuation travel of the triggering lever is used entirely for advancing the piston rod.

After the piston rod has completed the dispensing operation and reaches its forward end position, both the second clamping lever and the first clamping lever are pivoted simultaneously to a position at right angles relative to the piston rod by the actuation element located on the piston rod. If the triggering lever is actuated when the piston rod has arrived in its front end position, the actuating element presses against the unlocking lever, so that the triggering lever can be freely pulled through its travel without transmitting any force. Accordingly, it is impossible for the triggering lever to exert force on the piston rod which would cause damage to the front end region of the tool in the dispensing direction. To be able to pull back the piston rod into its initial or starting position, it is necessary to press the unlocking lever manually into the unlocking position. If the unlocking lever is actuated manually then at the same time that the piston rod is pulled back into its initial position, movement of the triggering lever is possible.

Preferably, a transmission element is located between the first clamping lever and the second clamping lever. To assure a simple transmission of the basically axial movement of the second clamping lever to the first clamping lever, the transmission element actuated by the unlocking lever can be shaped at least as a single part and can coact with the first clamping lever as well as with the second clamping lever. Such a transmission element must be shaped so that there is axial clearance or play between the first and second clamping levers in the initial position of the tool. This play must be such that the first clamping lever coming to a stop against the triggering lever can be pivoted into its clamping position on the piston rod without contacting the transmission element.

In one embodiment, preferably the transmission element is disposed between the unlocking lever and the first clamping lever. With such a transmission element, when the unlocking lever is actuated, the second clamping lever is displaced by the unlocking lever and the first clamping lever is actuated by the transmission element which embraces or overlaps the second clamping lever.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

The drawing is an elevational view, partly in section, of a dispensing tool embodying the present invention illustrating only a part of the forward region of the tool.

DETAILED DESCRIPTION OF THE INVENTION

As shown in the drawing, the tool 1 has a tubular shaped axially extending part 2 containing a foil bag 3 holding a mass of material to be dispensed. A dispensing nozzle 4 is located on the front end 1a of the tool, that is, the end facing the direction in which the mass is dispensed from the tool.

At the rear end 2b of the part 2 there is a rear end part 5 containing the advancing or feeding mechanism 6. The advancing mechanism 6 includes an axially extending piston rod 7 with a piston 8 on its front end, that is, the leading end in the dispensing direction. The piston rod 7 extends through the rear part 5 into the forward part 2. The rear part 5 is shaped in part as a grip 9 with a triggering lever 11 pivotally mounted about an axis 10 within the rear part. The triggering lever 11 extends outwardly from the grip 9 so that it can be operated by a person holding the grip.

To squeeze the mass out of the foil bag 3, the triggering lever 11 is pivoted counterclockwise around the axis 10, note the direction of the arrow at the lower end of the triggering lever 11, so that the piston rod 7 moves axially in the dispensing direction with the piston 8 on the forward end of the piston rod 7 pressing against the rear end region of the foil bag 3.

The piston rod 7 is advanced in the dispensing direction by a first clamping lever 12 pressed opposite to the dispensing direction by a first compression spring 14. The spring 14 biases the first clamping lever 12 against a stop 11a on the triggering lever 11. The triggering lever 11 is pivotally displaceable between two end stops 5b, 5c located on the rear part 5. The first clamping lever 12 and a second clamping lever 13 each has a through opening 12a, 13a, somewhat wider than the diameter of the piston rod, whereby the piston rod is freely displaceable relative to the two clamping levers when they are located at a right angle to the axis of the piston rod. In its initial position, the first clamping lever 12 is in clamped engagement with the piston rod due to its one-sided contact with the stop 11a of the triggering lever 11. The first clamping lever 12 is displaced axially along with the piston rod when the trigger is gripped and pulled inwardly toward the grip. While the piston rod 7 is advanced, the through opening 12a of the first clamping lever 12 presses against the shaft 7a of the piston rod affording the requisite clamping action. The second clamping lever 13 holds the piston rod 7 in the position to which it is moved by the first clamping lever 12. The second clamping lever 13 rests in a pendular manner in a recess of the rear piece 5, not shown, and is pivoted by a compression spring 15 relative to the shaft 7a of the piston rod 7. The second clamping lever 13 yields to the advancing piston rod 7 and any possible return stroke is absorbed by the second clamping lever 13, since it is clamped against the piston rod. When the triggering lever 11 is released, the first clamping lever 12 returns into its initial position and a new advancing stroke can be effected immediately or at a later time until the foil bag 3 within the front part 2 of the tool 1 has been emptied.

After the foil bag 3 located in the tool 1 has been completely dispensed the piston rod 7 is in its front end position, not shown. To prevent damaging the front end region 1a of the tool 1, an actuating element 16 is located on the rear end of the piston rod 7 and cooperates with an unlocking lever 17 arranged partly in the end part 5 and extending out of the end part so that the unlocking lever can be pivoted in the axial direction of the tool, whereby it acts essentially simultaneously on the first clamping lever 12 and the second clamping lever 13. When the unlocking lever is actuated which can be effected manually, both clamping levers 12, 13 are pivoted into a position perpendicular to the axis of the piston rod 7, so that the piston rod can be freely displaced relative to the clamping levers 12, 13. The motion effected by the unlocking lever 17 is transmitted by a suitable transmission element 18 to the first clamping lever 12 and the second clamping lever 13.

Actuating element 16, located on the rear end of the piston rod 7, has run-up surfaces 16a which cooperate with matching run-up surfaces 17a on the unlocking lever 17.

While a specific embodiment of the invention has been shown and described in detail to illustrate the inventive principles, it will be understood that the invention may be embodied otherwise without departing from said principles.

I claim:

1. A tool for dispensing a single component or a multi-component mass within a cartridge or foil bag (3) by pressing the mass out of the cartridge or foil bag (3), comprising:

at least one axially extending piston rod (7) and at least one advancing mechanism (6) for moving the piston rod (7) in a dispensing direction, said advancing mechanism including first and second clamping levers (12, 13) mounted on the piston rod (7) and being displaceable in the axial direction of said piston rod and being pivotable about an axis extending transversely of the piston rod, wherein said first clamping lever (12) is for moving said piston rod (7) in the dispensing direction and the second clamping lever (13) is for locking said piston rod (7) in the axially displaced position;

at least two springs (14, 15) in biasing contact each with a different one of said first and second clamping levers (12, 13), a triggering lever (11) for operating said first clamping lever (12) and an unlocking lever (17), which when pivoted, moves a transmission element (18) for substantially simultaneously disengaging said first clamping lever (12) from the piston rod (7) and unlocking said second clamping lever (13), said transmission element (18)

being at least in part, located between said first and second clamping levers (12, 13), whereby the locking lever (17) moves the transmission element (18), thereby pivoting the first and second clamping levers such that the piston rod (7) can be freely displaced relative to the clamping levers (12, 13), wherein an axial stop (11*a*) for said first clamping lever (12) is located on said triggering lever (11), and said triggering lever is pivotally mounted for pivotal movement between two spaced end stops (5*b*, 5*c*).

2. A tool according to claim 1, wherein a transmission element (18) is located between said unlocking lever (17) and said first clamping lever (12).

3. A tool according to claim 2, wherein said tool comprises a front part (2) containing the foil bag (3), and a rear part containing said first and second clamping levers (12, 13) and said triggering lever (11), and said rear part forms said end stops (5*b*, 5*c*) for said triggering lever (11), said unlocking lever (17) is located in part within said rear part in contact with said transmission element (18) and extends rearwardly out of said rear part.

4. A tool according to claim 3, wherein said at least two springs (14, 15) comprises a first spring (14) located forwardly in the dispensing direction between a wall of said rear end part (5) and said first clamping element (12) and a second spring element (15) located on the opposite side of said first clamping lever (12) from said first spring (14) and extends therefrom into contact with a side of said second clamping lever (13) facing in the dispensing direction.

* * * * *

UNITED STATES PATENT AND TRADEMARK OFFICE

CERTIFICATE OF CORRECTION

PATENT NO. : 5,370,282

DATED : December 6, 1994

INVENTOR(S) : Andreas Sedlmeier

It is certified that error appears in the above-indentified patent and that said Letters Patent is hereby corrected as shown below:

On the title page, item [75] Inventor: should read --Andreas Sedlmeier--.

Signed and Sealed this

Twenty-first Day of February, 1995

Attest:

BRUCE LEHMAN

Attesting Officer

*Commissioner of Patents and Trademarks*